US012283258B2

(12) United States Patent
Chen et al.

(10) Patent No.: US 12,283,258 B2
(45) Date of Patent: Apr. 22, 2025

(54) TWO-WAY COMMUNICATION TO ALLOW CONSISTENT PER-FRAME CONFIGURATION UPDATE

(71) Applicant: Apple Inc., Cupertino, CA (US)

(72) Inventors: Yung-Chin Chen, Saratoga, CA (US); Hopil Bae, Palo Alto, CA (US); Mahdi Farrokh Baroughi, Santa Clara, CA (US); Sheng Zhang, San Jose, CA (US); Yanghyo Kim, Cupertino, CA (US); Young Don Bae, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/119,772

(22) Filed: Mar. 9, 2023

(65) Prior Publication Data

US 2024/0304163 A1 Sep. 12, 2024

(51) Int. Cl.
*G09G 5/12* (2006.01)
*G09G 5/18* (2006.01)

(52) U.S. Cl.
CPC ................. *G09G 5/12* (2013.01); *G09G 5/18* (2013.01); *G09G 2320/041* (2013.01); *G09G 2320/0673* (2013.01); *G09G 2340/0435* (2013.01)

(58) Field of Classification Search
CPC .. G09G 3/00; G09G 3/20; G09G 3/32; G09G 3/34; G09G 3/36; G09G 3/3233; G09G 3/3275; G09G 3/3208; G09G 3/3225; G09G 3/3291; G09G 3/3266; G09G 5/00; G09G 5/10; G09G 5/12; G09G 5/18; G09G 5/38; G09G 5/39; G09G 5/377; G09G 5/393; G09G 5/395; G09G 5/399; G06T 1/20; G06T 1/60; G02F 1/133; G02F 1/136; G02F 1/1362; G02F 1/1335; G02F 1/1368
See application file for complete search history.

(56) References Cited

U.S. PATENT DOCUMENTS

| | | | | |
|---|---|---|---|---|
| 2003/0001810 | A1 | 1/2003 | Yamaguchi et al. | |
| 2006/0097968 | A1 | 5/2006 | Yamamoto et al. | |
| 2012/0307161 | A1 | 12/2012 | Ishihara et al. | |
| 2017/0193971 | A1 * | 7/2017 | Bi | G09G 5/18 |
| 2018/0075798 | A1 | 3/2018 | Nho et al. | |
| 2018/0350313 | A1 | 12/2018 | Nambi et al. | |
| 2020/0042264 | A1 * | 2/2020 | Zheng | G09G 5/005 |
| 2020/0051516 | A1 | 2/2020 | Kim et al. | |
| 2020/0132996 | A1 * | 4/2020 | Yokota | G06F 3/013 |
| 2020/0302871 | A1 * | 9/2020 | Zhang | G09G 3/3233 |

(Continued)

FOREIGN PATENT DOCUMENTS

CN 100583955 C 1/2010

OTHER PUBLICATIONS

International Search Report and Written Opinion for PCT Application No. PCT/US2024/018396 dated Jul. 8, 2024; 10 pgs.

*Primary Examiner* — Chanh D Nguyen
*Assistant Examiner* — Nguyen H Truong
(74) *Attorney, Agent, or Firm* — Fletcher Yoder, P.C.

(57) ABSTRACT

An electronic device uses a leader synchronize signal generator to synchronize clock signal generators used by multiple components in the electronic device to a common time-base. A processor core complex of the electronic device sends per-frame configuration to a timing controller for frames to be displayed on an electronic display before a corresponding frame begins.

20 Claims, 10 Drawing Sheets

(56) References Cited

U.S. PATENT DOCUMENTS

| | | | | |
|---|---|---|---|---|
| 2022/0051631 | A1 | 2/2022 | Cheon et al. | |
| 2022/0114957 | A1 | 4/2022 | Lee et al. | |
| 2023/0298508 | A1* | 9/2023 | Lee | G09G 5/18 |
| 2023/0306890 | A1* | 9/2023 | Cho | G09G 3/2092 |
| 2024/0071273 | A1* | 2/2024 | Bae | G06F 3/0416 |

* cited by examiner

TWO-WAY COMMUNICATION TO ALLOW CONSISTENT PER-FRAME CONFIGURATION UPDATE

BACKGROUND

This disclosure relates to systems, methods, and devices to synchronize gamma setting and send frame configuration on a per-frame basis for an electronic device with one or more electronic displays.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Numerous electronic devices-including televisions, portable phones, computers, wearable devices, vehicle dashboards, virtual-reality glasses, and more-display images on an electronic display. To display an image, an electronic display may control light emission of its display pixels based at least in part on corresponding image data. In the electronic device, multiple components may use clock signals generated by different clock signal generators. The clock signals generated by different clock signal generators may not be completely identical and a clock drift among different components may appear after a certain period of time, which could cause a frame to be repeated or dropped from the electronic display.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

As previously mentioned, in an electronic device, multiple components may use clock signals generated by more than one clock signal generators (e.g., crystals). The clock signals generated by different clock signal generators may not be completely identical and a clock drift among different components may appear after a certain period of time, which may cause a frame to be repeated on or dropped from the electronic display. Some electronic devices may define a time-base to manage time-related operations in components associated with the electronic display. For example, the time-base may be used to determine whether it is time to display a frame. For instance, a global time-base (GTB) may be used as the time-base in the electronic device. For example, the computing system (e.g., processing circuitry, processor(s)) of an electronic device may implement the generic Precision Time Protocol (gPTP) time-base based on IEEE 802.1 AS Precision Time Protocol. The GTB time may be broadcast to a subset or to all components within the computing system periodically, and a timer (e.g., a clock signal generator) in each component may synchronize to the GTB time. For example, a component of the electronic device may have a clock signal generator and use it to generate a clock signal for time-related operations in the component. A clock drift may occur between the clock signal generator in the component and the gPTP time-base used by the computing system since they are not generated from the same clock generator and the system may go out of synchronization. A leader synchronize signal generator may be used by a computing system of the electronic device to synchronize the clock signal generators used by the multiple components so that the generated clock signals are synchronized to a common time-base, e.g., the gPTP time-base.

The present disclosure provides techniques for utilizing a leader synchronize signal generator to synchronize clock signal generators used by multiple components so that the generated clock signals of the multiple components are synchronized to a common time-base, e.g., the gPTP time-base. By utilizing the leader synchronize signal generator, the computing system of the electronic device may send per frame configuration via a two-way communication channel to a timing controller for every frame to be displayed on the electronic display before the corresponding frame begins. The per frame configuration may include frame information, such as foveation information, intra frame pause (IFP) locations and length, emission rate, frame duration, brightness, aggressive link power management (ALPM), etc., as described in greater detail herein. In addition, the computing system and the timing controller may maintain gamma setting synchronized. When the timing controller detects a temperature induced current/voltage (I/V) drift, the timing controller may calculate related gamma setting based on the temperature induced I/V drift and send to the electronic display. In addition, the timing controller may calculated updated gamma-related coefficients and interrupt the computing system to read the updated gamma-related coefficients from the timing controller via another two-way communication channel. The computing system may use the updated gamma-related coefficients to update related gamma setting. The two communication channels may form a closed loop, which may allow maintaining consistent gamma settings.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment", "an embodiment", or "some embodiments" of the present disclosure are not intended to be interpreted as excluding the existence of additional embodiments that also incorporate the recited features. Use of the term "approximately" or "near" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

Figure 1:
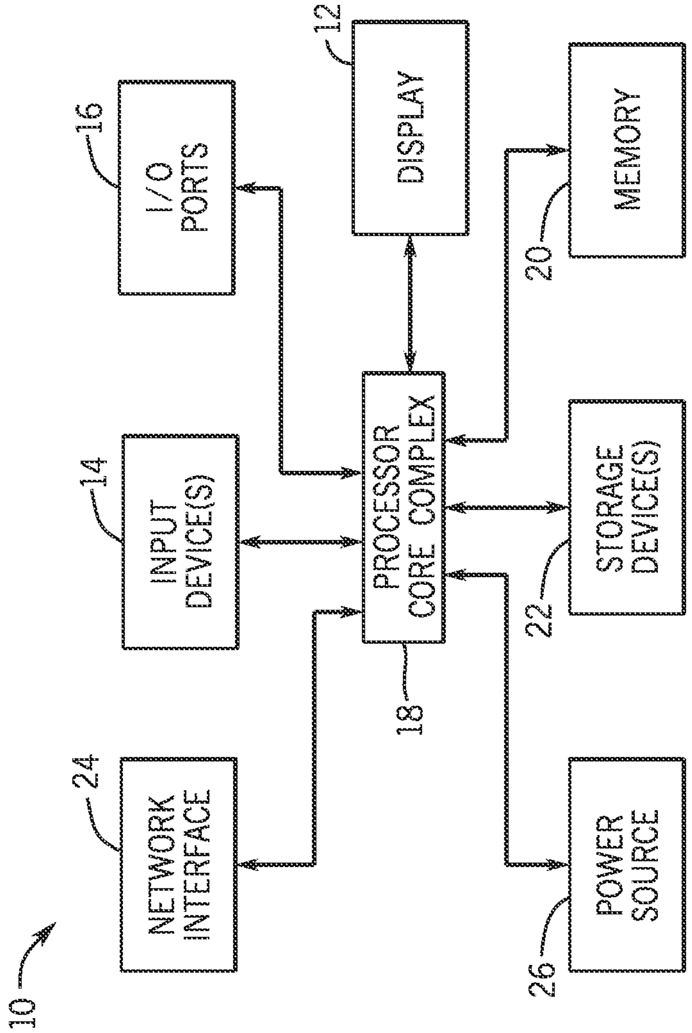
FIG. 1 is a block diagram of an electronic device, according to an embodiment of the present disclosure.

With the preceding in mind and to help illustrate, an electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 includes the electronic display 12, one or more input devices 14, one or more input/output (I/O) ports 16, a processor core complex 18 having one or more processing circuitry(s) or processing circuitry cores, local memory 20, a main memory storage device 22, a network interface 24, and a power source 26 (e.g., power supply). The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, a touch sensing, or the like. The input device 14 may include touch-sensing components (e.g., touch control circuitry, touch sensing circuitry) in the electronic display 12. The touch sensing components may receive user inputs by detecting occurrence or position of an object touching the surface of the electronic display 12.

In addition to enabling user inputs, the electronic display 12 may be a display panel with one or more display pixels. For example, the electronic display 12 may include a self-emissive pixel array having an array of one or more of self-emissive pixels or liquid crystal pixels. The electronic display 12 may include any suitable circuitry (e.g., display driver circuitry) to drive the self-emissive pixels, including for example row driver and/or column drivers (e.g., display drivers). Each of the self-emissive pixels may include any suitable light emitting element, such as an LED (e.g., an OLED or a micro-LED). However, any other suitable type of pixel, including non-self-emissive pixels (e.g., liquid crystal as used in liquid crystal displays (LCDs), digital micromirror devices (DMD) used in DMD displays) may also be used. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement).

The electronic display 12 may display an image by controlling pulse emission (e.g., light emission) from its display pixels based on pixel or image data associated with corresponding image pixels (e.g., points) in the image. In some embodiments, pixel or image data may be generated by an image source (e.g., image data, digital code), such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display an image frame of content based on pixel or image data generated by the processor core complex 18, or the electronic display 12 may display frames based on pixel or image data received via the network interface 24, an input device, or an I/O port 16.

Figure 2:
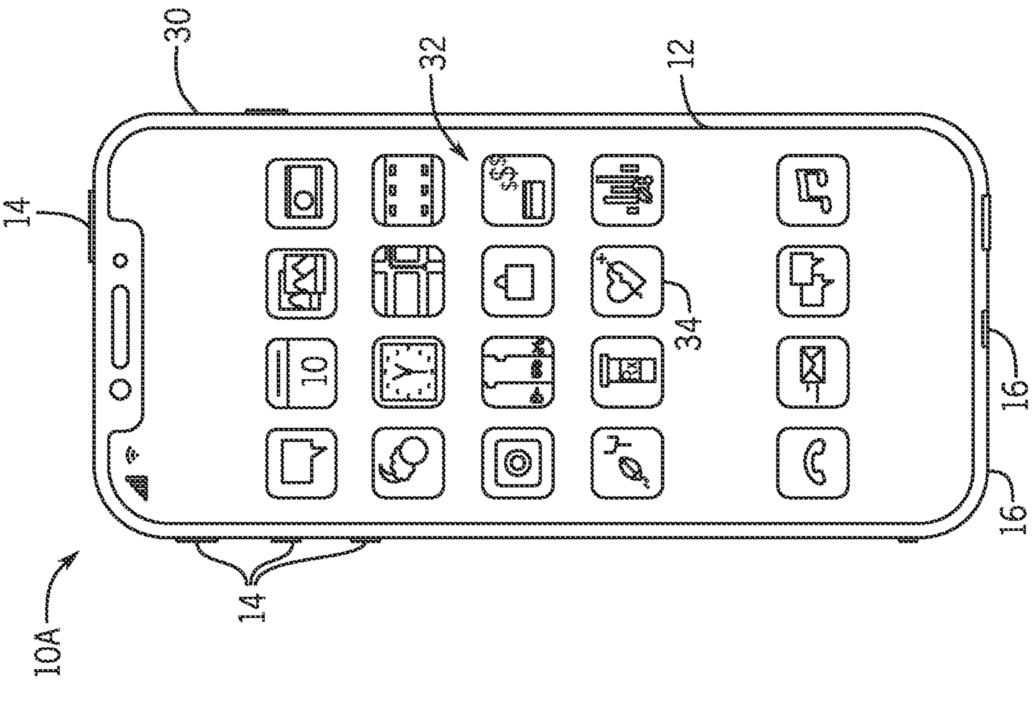
FIG. 2 is a perspective view of a notebook computer representing an embodiment of the electronic device of FIG. 1.

The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smart phone, such as any IPHONE® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
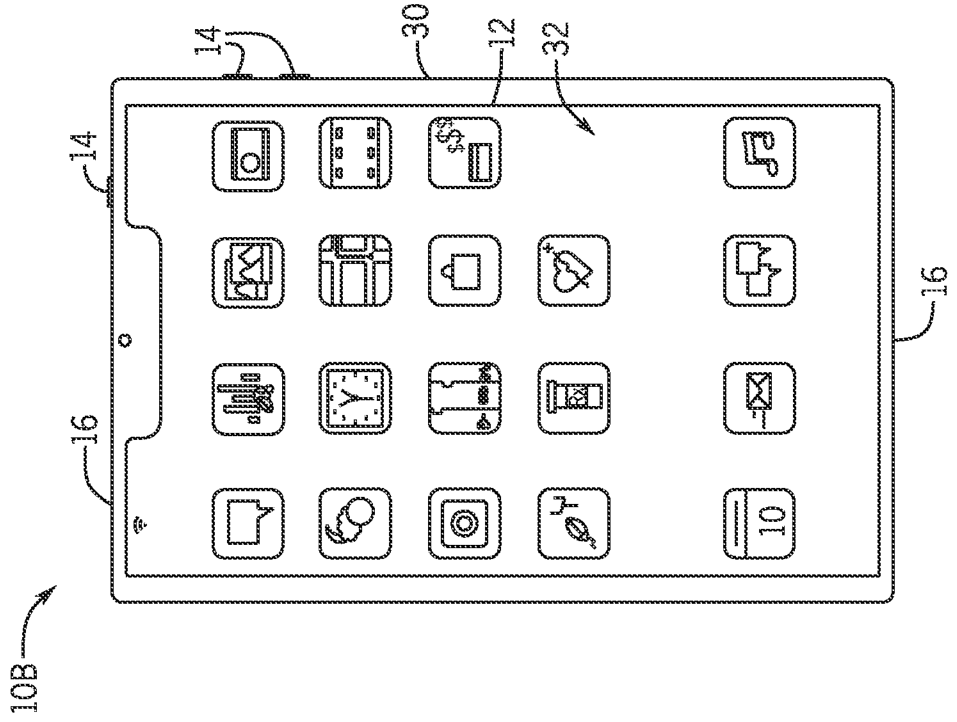
FIG. 3 is a front view of a handheld device representing another embodiment of the electronic device of FIG. 1.
Figure 4:
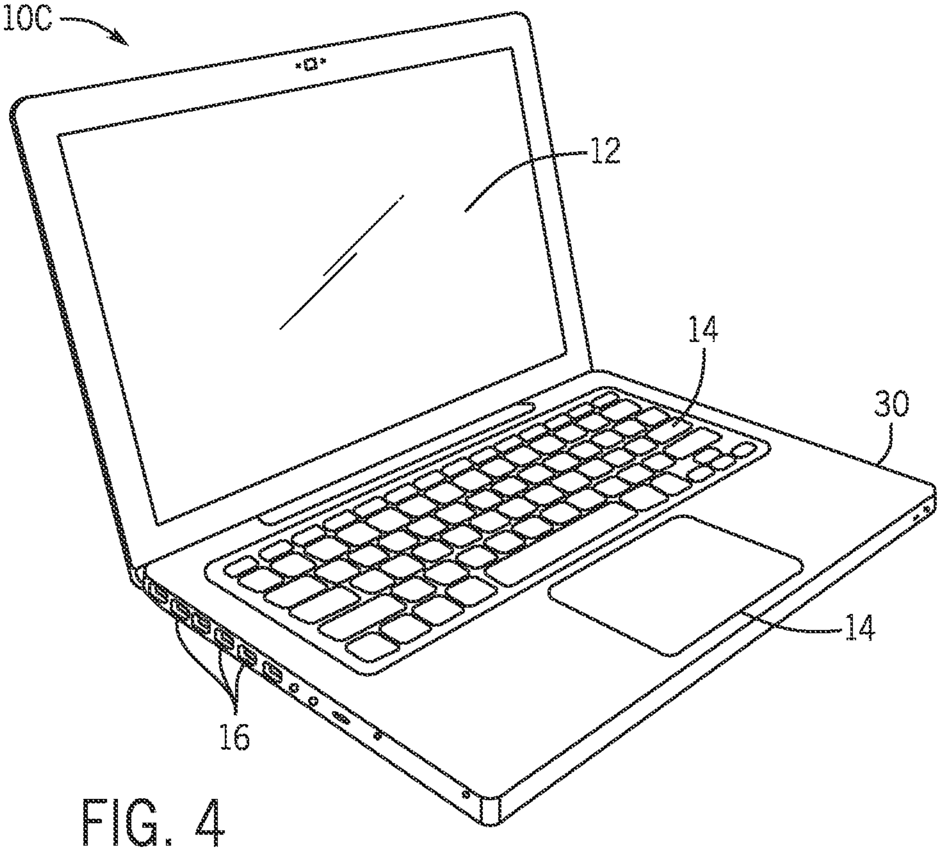
FIG. 4 is a front view of another handheld device representing another embodiment of the electronic device of FIG. 1.
Figure 5:
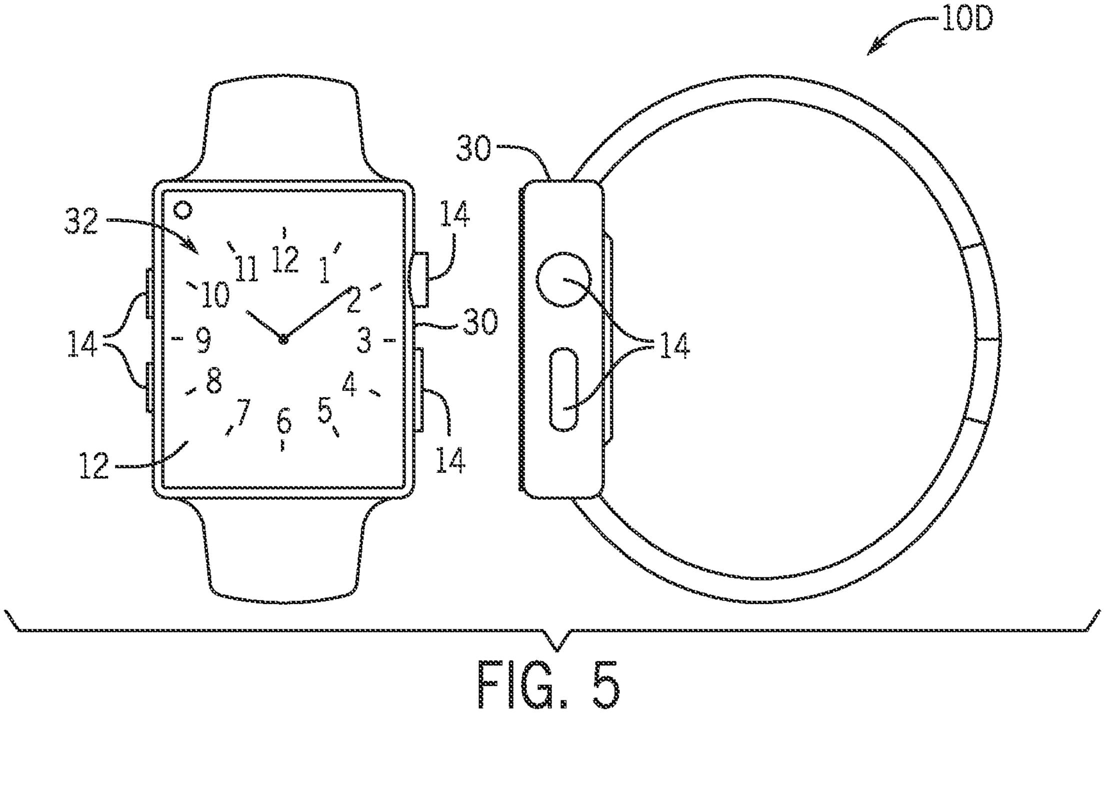
FIG. 5 is a front view and side view of a wearable electronic device representing another embodiment of the electronic device of FIG. 1.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a wearable electronic device 10D, is shown in FIG. 5. For illustrative purposes, the wearable electronic device 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
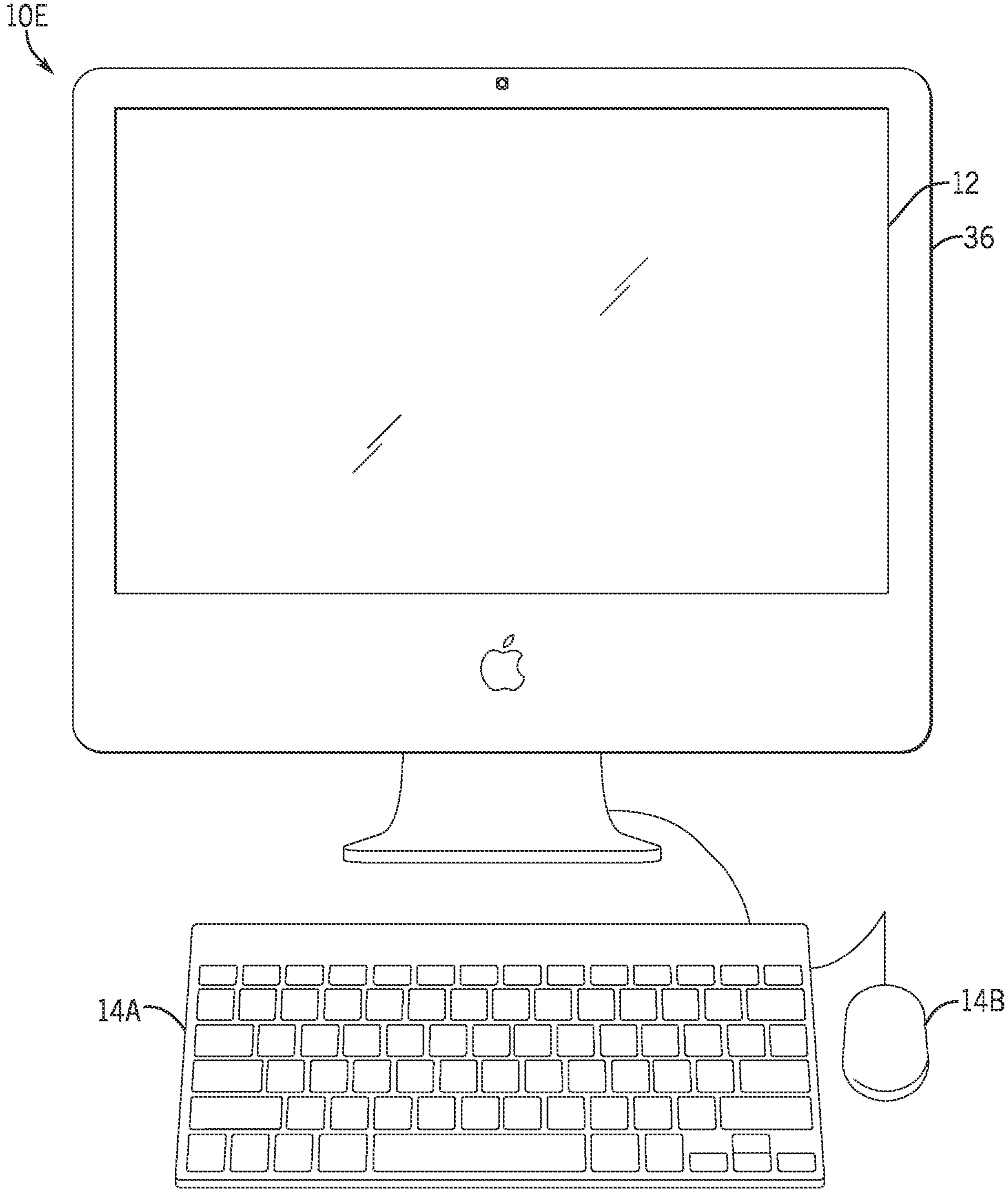
FIG. 6 is a front view of a desktop computer representing another embodiment of the electronic device of FIG. 1.

Turning to FIG. 6, a computer 10E may represent another embodiment of the electronic device 10 of FIG. 1. The computer 10E may be any computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 36 may be provided to protect and enclose internal components of the computer 10E, such as the electronic display 12. In certain embodiments, a user of the computer 10E may interact with the computer 10E using various peripheral input structures 14, such as the keyboard 14A or mouse 14B (e.g., input structures 14), which may connect to the computer 10E.

Figure 7:
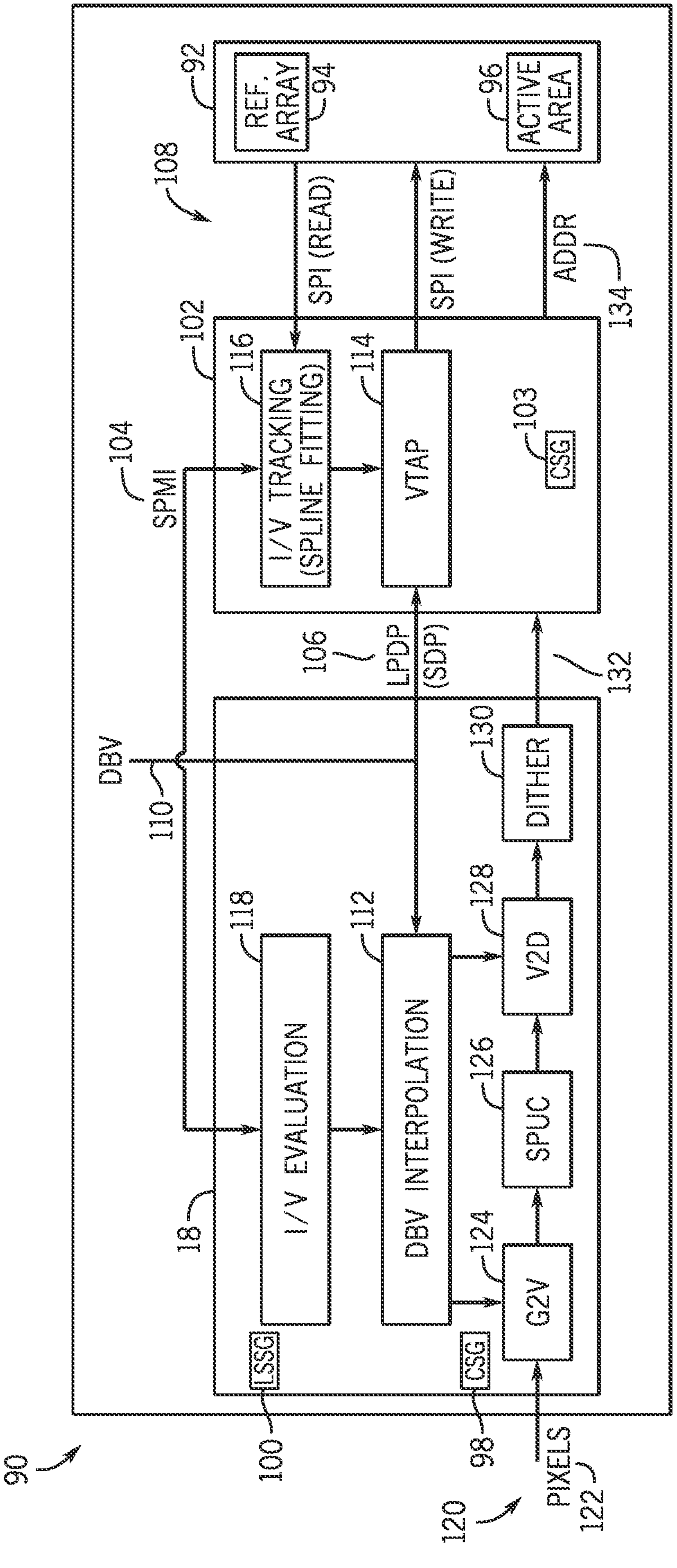
FIG. 7 is a schematic block diagram illustrating a close loop communication in the electronic device of FIG. 1, according to embodiments of the present disclosure.
Figure 11:
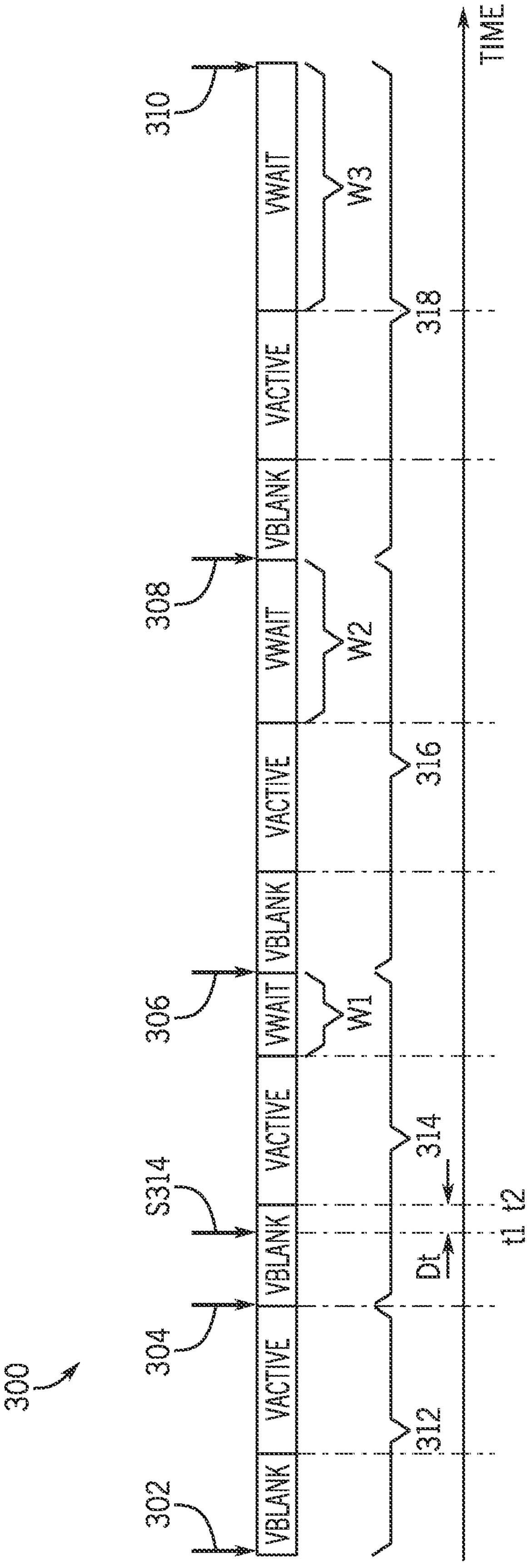
FIG. 11 is a timing diagram illustrating a frame rate change mechanism, according to embodiments of the present disclosure.

With the foregoing in mind, FIG. 7 is a schematic block diagram illustrating a close loop communication 90 among the processor core complex 18, an electronic display panel 92 of the electronic display 12 and a timing controller (TCON) 102 in the electronic display 12. The electronic display panel 92 may include a reference array 94, an active area 96, and associated driver circuits (e.g., scan driver, data driver). The reference array 94 may include an array of display pixels used to monitor parameters on the display panel 92 (e.g., pixel driving current/voltage (I/V)). The processor core complex 18 may send information associated with display settings such as Display Brightness Value (DBV) and frame configurations (e.g., foveation information, intra frame pause (IFP) locations and length, emission rate, frame duration, brightness) to the TCON 102 to control displaying image frames on the active area 96 of the display panel 92. In the electronic device 10, multiple components, such as the processor core complex 18 and the TCON 102, may use clock signals generated by more than one clock signal generators to control some time-related operations. For example, a clock signal generator (CSG) 98 in the processor core complex 18 may generate a clock signal used for time-related operations in the processor core complex 18, and a clock signal generator (CSG) 103 in the TCON 102 may generate a clock signal used for time-related operations in the TCON 102. The clock signals generated by different clock signal generators may not be completely identical and a clock drift among different components may appear after a certain period of time and the system may go out of synchronization. For example, the clock signals generated by the clock signal generators 98 and 103 may not be completely identical, and a clock drift between the processor core complex 18 and the TCON 102 may cause a frame to be repeated on or dropped from the display panel 92. Accordingly, a leader synchronize signal generator (LSSG) 100 in the processor core complex 18 may be used to synchronize the clock signals generated in multiple components (e.g., by the clock signal generator 98 and by the clock signal generator 103) to a common time-base (e.g., the generic Precision time Protocol (gPTP) time-base based on IEEE 802.1 or global time-base (GTB)). For example, in certain embodiments, the clock signal generated by the clock signal generator 103 in the TCON 102 may follow a leader synchronize signal generated by the leader synchronize signal generator 100 in the processor core complex 18 so that the TCON 102 may stay synchronized with the leader synchronize signal on a per-frame basis. Accordingly, by utilizing the leader synchronize signal generator 100, the processor core complex 18 may send frame configuration to the TCON 102 on a per-frame basis for every frame to be displayed on the display panel 92 before the corresponding frame begins, as illustrated in FIG. 11. In some embodiments, the processor core complex 18 may send frame configuration to the TCON 102 on a multiple frames bases (e.g., two frame bases, three frame bases, and the like) when the multiple frames use the same frame configuration. In some embodiments, the processor core complex 18 may send frame configuration to the TCON 102 on demand (e.g., when the frame configuration is updated). The frame configuration may include frame information, such as foveation information, intra frame pause (IFP) locations and length, emission rate, frame duration, brightness, ALPM, etc.

In some embodiments, a clock signal generated by a clock signal generator in a component of the electronic device 10 (e.g., the clock signal generator 103 in the TCON 102) may follow the leader synchronize signal generated by the leader synchronize signal generator 100 in the processor core complex 18 so that the component (e.g., the TCON 102) may stay synchronized with the processor core complex 18 on a per-frame basis or on a multiple frames basis (e.g., two frame bases, three frame bases, and the like), which is associated with the time-related operations in the component. For example, the multiple frame basis (e.g., two frame bases, three frame bases, and the like) synchronization may be sufficient for the time-related operations in the component. For instance, in some embodiments, the processor core complex 18 may implement two dedicated fractional timers (e.g., 80 bit) with programmable increment and offset to track the common gPTP time. The processor core complex 18 may implement multiple (e.g., 32) programmable pulse waveforms for multiple components, such as cameras, display pipelines, external audio phase-locked loop (PLL), etc. Consequently, a subset or all components in the electronic device 10 may be synchronized to a common time-base (e.g., the gPTP time-base). The processor core complex 18 may implement multiple gPTP timers (e.g., two) to allow switching from one timing leader to another timing leader.

Figure 9:
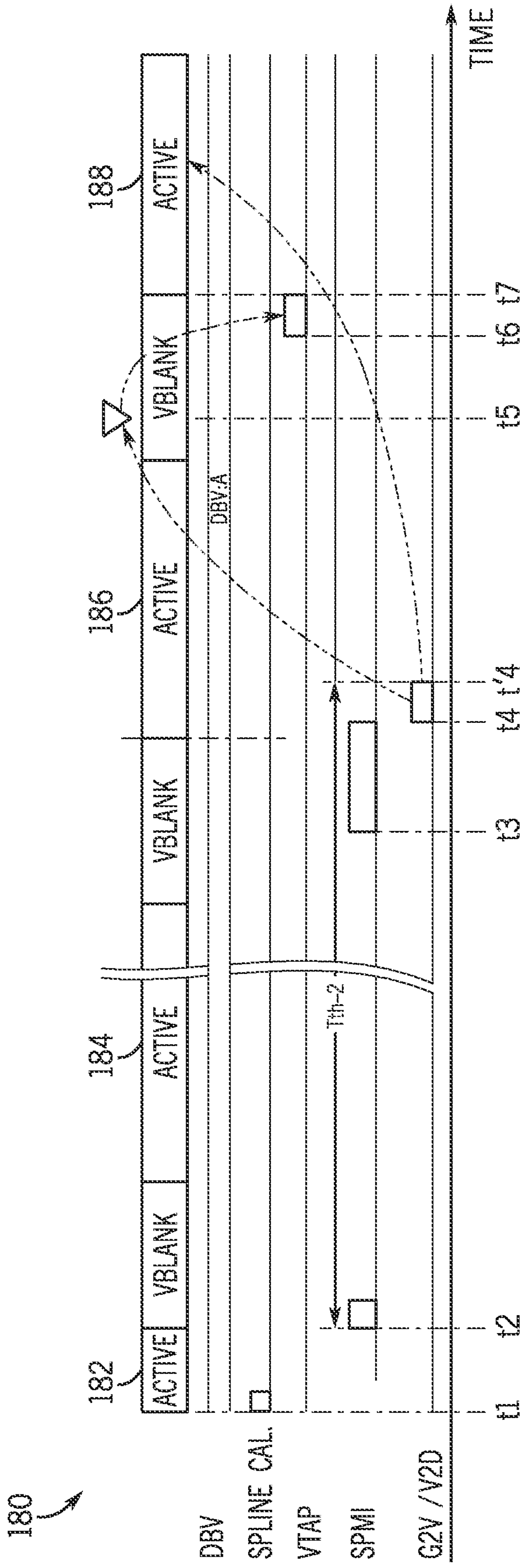
FIG. 9 is a timing diagram illustrating another embodiment of synchronizing in the electronic device of FIG. 1, according to embodiments of the present disclosure.
Figure 10:
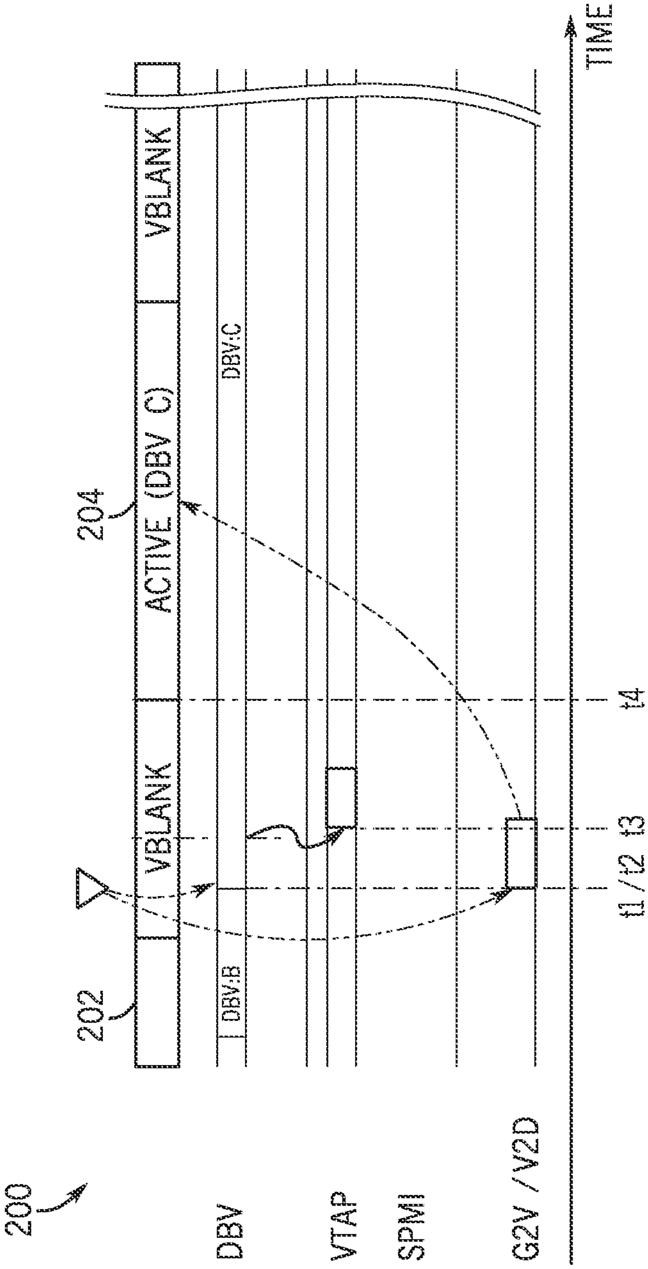
FIG. 10 is a timing diagram illustrating an embodiment of command flow in the electronic device of FIG. 1, according to embodiments of the present disclosure.

As illustrated in FIG. 7, there are two-way communication channels between the processor core complex 18 and the TCON 102 via two interfaces, a System Power Management Interface (SPMI) interface 104 and a Low-Power DisplayPort (LPDP) interface 106, respectively. The communication via the SPMI 104 and the communication via the LPDP 106 may form a closed loop communication. This closed loop communication mechanism may allow maintaining consistent gamma settings between the processor core complex 18 and the TCON 102. The SPMI interface 104 may be used for communication between the processor core complex 18 and the TCON 102 for synchronizing information associated with gamma setting (e.g., spline coefficients defining the relationship between a driving voltage (V) and a driving current (I) of a display pixel). Example processes of synchronizing the gamma setting between the processor core complex 18 and the TCON 102 via the SPMI interface 104 are described in detail below and illustrated in FIG. 8 and FIG. 9. In addition, the processor core complex 18 may implement Secondary Data Packet (SDP) command packets in LPDP protocol to communicate information associated with Display Brightness Value (DBV) and frame configurations (e.g., emission rate, frame duration, brightness, foveation information, IFP (intra frame pause) locations and length) with the TCON 102 via the LPDP interface 106. An example process of DBV (Display Brightness Value) command flow between the processor core complex 18 and the TCON 102 using SDP packets via the LPDP interface 106 is illustrated in FIG. 10.

Figure 8:
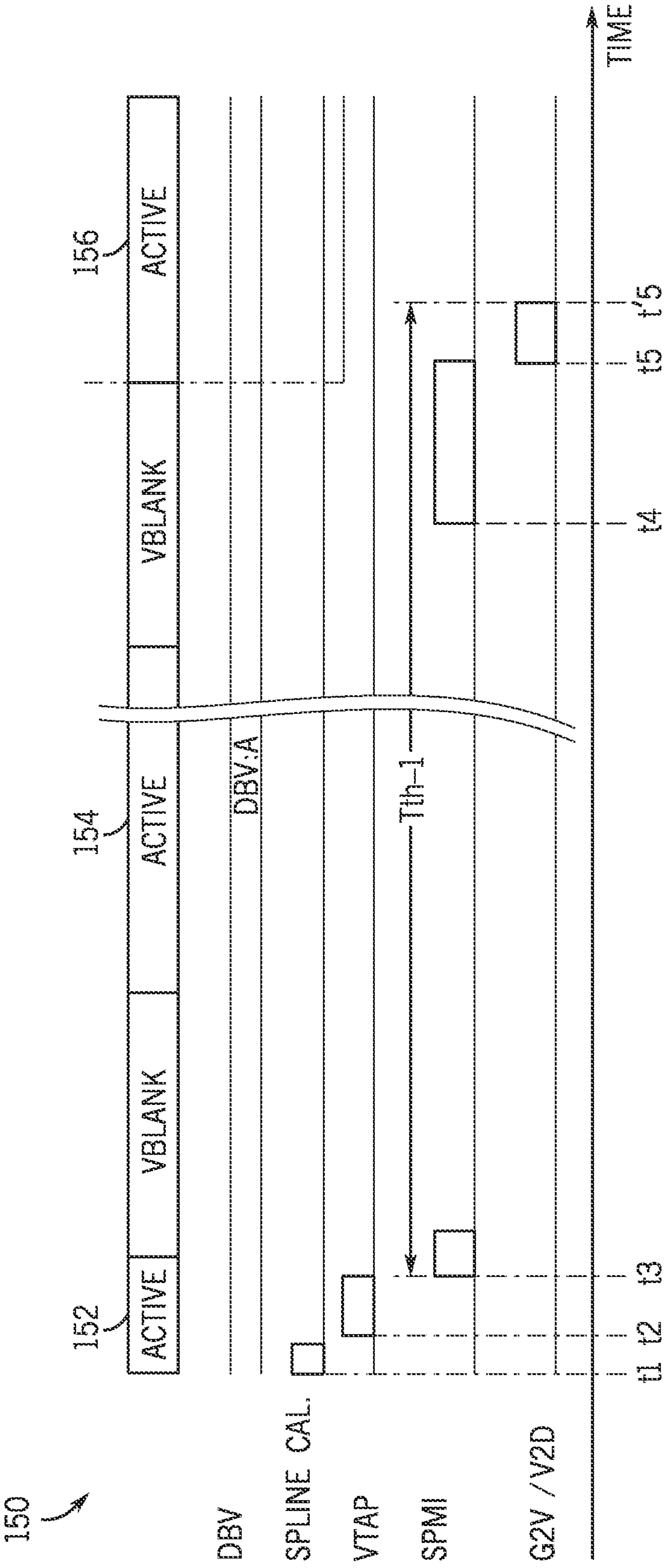
FIG. 8 is a timing diagram illustrating an embodiment of synchronizing in the electronic device of FIG. 1, according to embodiments of the present disclosure.

The TCON 102 may communicate with the display panel 92 via a System Programming Interface (SPI) interface 108, such as read from the display panel 92 (SPI (Read)), or write to the display panel 92 (SPI (Write)). For instance, the processor core complex 18 may read from the TCON 102, via the SPMI interface 104, an initial temperature parameter and an initial spline coefficient generated by the TCON 102. Spline coefficients may be used to define the relationship between a driving voltage (V) and a driving current (I) of a display pixel. A Display Brightness Value (DBV) command may be transmitted to the processor core complex 18 and the TCON 102 via a signal line 110 through the LPDP interface 106. The processor core complex 18 may calculate Gray level to Voltage conversion (G2V) and Voltage to Digital code conversion (V2D) Look Up Tables (LUTs) by using LUT interpolation at block 112, and the TCON 102 may calculate Voltage of Tap point (Vtap), which is associated with gamma setting, at block 114 and send it to the display panel 92 via the SPI interface 108. The G2V LUT is a global LUT that maps the gray code/level (target light at the present DBV) to a voltage of a pixel in the display panel 92. As the temperature changes, the G2V characteristics also changes, therefore, the G2V LUT may be re-generated periodically to track a temperature induced I/V shift of the pixel driver, which may be measured by the reference array 94 in the display panel 92. The TCON 102 may, at block 116, track the reference array I/V sensing to detect the temperature induced I/V drift on a regular basis (e.g., every 1 second) and calculate the updated spline coefficients based on the detected temperature induced I/V drift. The TCON 102 may send an interrupt request to the processor core complex 18 via the SPMI interface 104. In some embodiments, the TCON 102 may generate and update the Vtap based on the I/V sensing and write to the display panel 92 via the SPI interface 108, as illustrated in FIG. 8. In other embodiments, the TCON 102 may wait for the processor core complex 18 to send a signal (e.g., via an SDP command) for the I/V update, then the TCON 102 may calculate the Vtap and write to the display panel 92 via the SPI interface 108, as illustrated in FIG. 9. After receiving the interrupt request from the TCON 102, the processor core complex 18 may read, via the SPMI interface 104, the updated spline coefficients (e.g., 40 floating-point spline coefficients) from the TCON 102, and the processor core complex 18 may perform I/V evaluation at block 118 and update or build new G2V and V2D LUTs with the updated spline coefficients.

A display pixel pipeline 120 in the processor core complex 18 may be used for preparing pixels data 122 to be displayed on the display panel 92, as illustrated in FIG. 7. In the display pixel pipeline 120, the pixels data 122 are input into the processor core complex 18. At block 124, the processor core complex 18 may convert gray levels of the pixels data 122 to voltage codes in the G2V LUT and, at block 126, the Sub-pixel Uniformity Compensation (SPUC) may be conducted in voltage domain. At block 128, the processor core complex 18 may use the V2D LUT to convert the output of the SPUC from voltage data to digital codes. At block 130, the processor core complex 18 may use a dither to compensate for errors of the digital codes and send the compensated digital codes to the TCON 102 via a data line 132. Then the TCON 102 may send the compensated digital codes to the display panel 92 via an address line ADDR 134. The display panel 92 may use the compensated digital codes to calculate a Digital code to Voltage conversion (D2V) LUT, which maps digital codes with display pixel voltages. The display pixel voltages may be sent to the active pixels on the display panel 92. The display pixel voltages may also be sent to the reference array 94 on the display panel 92. As previously mentioned, the processor core complex 18 may send frame configuration to the TCON 102 on a per-frame basis for every frame to be displayed on the display panel 92 before the corresponding frame begins. The frame configuration may include frame information, such as foveation information, intra frame pause (IFP) locations and length, emission rate, frame duration, brightness, ALPM, etc. Accordingly, the display pixel pipeline 120 may use the clock signal generated by the clock signal generator 98 and the TCON 102 may use the clock signal generated by the clock signal generator 103 for time-related operations within a frame duration, which may not affect the display of the frame since the leader synchronize signal generated by the leader synchronize signal generator 100 may be used to keep the processor core complex 18 and the TCON 102 synchronized for every frame.

FIG. 8 is a timing diagram 150 illustrating an embodiment of synchronizing the gamma setting between the processor core complex 18 and the TCON 102 via the SPMI interface 104. The processor core complex 18 may synchronize the gamma setting due to temperature induced I/V drift with the TCON 102 via the SPMI interface 104. The TCON 102 may read out I/V measurements from the display panel 92 (e.g., from the reference array 94) periodically (e.g., once per second) to detect whether there is a gamma curve (e.g., spline coefficients) drift due to temperature change. At time t1, the TCON 102 may determine to update the gamma setting when the temperature induced I/V drift detected by the TCON 102 on an active frame 152 displaying on the active area 96 is greater than a threshold value (e.g., a certain percentage or a certain value), which may be determined by the TCON 102 based on a content of the active frame. For example, when the temperature induced I/V drift causes a perceivable image artifact of an image displaying on the active frame 152, the TCON 102 may determine to update the gamma setting to correct such artifact. The TCON 102 may calculate the updated spline coefficients based on the detected temperature induced I/V drift. At time t2, the TCON 102 may calculate the updated Vtap based on the updated spline coefficients and send the updated Vtap to the display panel 92. The display panel 92 may apply the updated Vtap to an active frame 154 next to the active frame 152. At time t3, the TCON 102 may send an interrupt signal to the processor core complex 18 via the SPMI interface 104. In some embodiments, the processor core complex 18 may monitor an interrupt bit associated with the interrupt signal every frame to detect whether there are new data to read. At time t4, the processor core complex 18 may read, via the SPMI interface 104, the updated spline coefficients (e.g., 40 floating-point spline coefficients) from the TCON 102. At time t5, the processor core complex 18 may perform I/V evaluation and update the G2V and V2D LUTs using the updated spline coefficients. The processor core complex 18 may prepare the updated G2V/V2D LUTS for the SPUC in the display pixel pipeline 120 by time t'5. The processor core complex 18 may apply the updated G2V/V2D LUTS to the display pixel pipeline 120 for the pixels on the next active frame. The time duration between time t3 and time t'5 may be less than a threshold value $T_{th-1}$ (e.g., a couple of frame durations) so that the updated gamma settings may be applied to a target active frame (e.g., an active frame next to the active frame 156). Accordingly, in the embodiment illustrated in FIG. 8, the updated gamma settings (e.g. Vtap, G2V/V2D LUTS) may be applied to the display panel 92 at different time, which may allow the software in the processor core complex 18 to have more time to update the LUTs. For example, the updated Vtap may be applied to the display panel 92 on the active frame 154, while the updated G2V/V2D LUTS may be prepared for the SPUC in the display pixel pipeline 120 during an active frame 156 and applied for the pixels on an active frame following the active frame 156.

FIG. 9 is a timing diagram 180 illustrating another embodiment of synchronizing the gamma setting between the processor core complex 18 and the TCON 102 via the SPMI interface 104. In FIG. 9, the TCON 102 may read out I/V measurements from the display panel 92 (e.g., from the reference array 94) periodically (e.g., once per second) to detect whether there is a gamma curve (e.g., spline coefficients) drift due to temperature change. At time t1, the TCON 102 may determine to update the gamma setting when the temperature induced I/V drift detected by the TCON 102 on an active frame 182 displaying on the active area 96 is greater than a threshold value (e.g., a certain percentage or a certain value). The TCON 102 may calculate the updated spline coefficients based on the detected temperature induced I/V drift. Other than the embodiment illustrated in FIG. 8, the Vtap may not be calculated and applied to an active frame 184 next to the active frame 182 in FIG. 9. At time t2, the TCON 102 may send an interrupt signal to the processor core complex 18 via the SPMI interface 104. In some embodiments, the processor core complex 18 may monitor an interrupt bit associated with the interrupt signal every frame to detect whether there are new data to read. At time t3, the processor core complex 18 may read, via the SPMI interface 104, the updated spline coefficients (e.g., 40 floating-point spline coefficients) from the TCON 102. At time t4, the processor core complex 18 may perform I/V evaluation and update the G2V and V2D LUTs using the updated spline coefficients. The processor core complex 18 may prepare the updated G2V/V2D LUTS for the SPUC in the display pixel pipeline 120 by time t'4, which may be within an active frame 186. At time t5, which may be during a VBLANK between the active frame 186 and an active frame 188, the processor core complex 18 may set the I/V update synchronize flag in a SDP command packet, which may be used to send corresponding frame configuration (e.g., emission rate, frame duration, brightness, foveation information, IFP (intra frame pause) locations and length) to the TCON 102 during the VBLANK period of each frame for every frame. The time duration between time t2 and time t'4 may be less than a threshold value $T_{th-2}$ (e.g., a couple of frame durations) so that the updated gamma settings may be applied to a target active frame (e.g., the active frame 188). At time t6, the TCON 102 may calculate the updated Vtap based on the updated spline coefficients and send the updated Vtap to the display panel 92. At time t7, the processor core complex 18 may apply the updated G2V/V2D LUTS to the display pixel pipeline 120 for the pixels on the active frame 188, and the display panel 92 may apply the updated Vtap to the active frame 188. Accordingly, in the embodiment illustrated in FIG. 9, the updated gamma settings (e.g. Vtap, G2V/V2D LUTS) may be applied to the display panel 92 at the same time (e.g., on the active frame 188).

In some embodiments, the processor core complex 18 may receive a DBV command periodically (e.g., every frame) or on demand to change the brightness of the display panel 92, and, as discussed above, the processor core complex 18 may apply the DBV command for every frame on a per-frame basis by utilizing the leader synchronize signal generator 100. For instance, the processor core complex 18 may send frame configuration (e.g., emission rate, frame duration, brightness, foveation information, IFP (intra frame pause) locations and length) to the TCON 102 for every frame to be displayed on the display panel 92 before the corresponding frame begins. In addition, some of the display pixel pipelines may be related to the brightness and may be changed at the same frame when updating the G2V/V2D LUTs. FIG. 10 is a timing diagram 200 illustrating an embodiment of DBV command flow between the processor core complex 18 and the TCON 102 using SDP packets via the interface 106. At time t1, which is in the VBLANK period after an active frame 202 and before an active frame 204, the processor core complex 18 may send an updated DBV to the TCON 102 via the SDP packet using the LPDP interface 106. Accordingly, the DBV data in the TCON 102 is updated (e.g., from DBV:B to DBV:C). At time t2 (which may be the same as t1), the processor core complex 18 may prepare the updated G2V/V2D LUTS for the SPUC in the display pixel pipeline 120 based on the updated DBV before the active frame 204 starts. At time t3, the TCON 102 may calculate the updated Vtap based on the updated DBV data in the TCON 102 (e.g., DBV:C) and send the updated Vtap to the display panel 92. At time t4, the processor core complex 18 may apply the updated G2V/V2D LUTS to the display pixel pipeline 120 for the pixels on the active frame 204, and the display panel 92 may apply the updated Vtap on the active frame 204.

The processor core complex 18 may also support frame rate (e.g., 90 Hz, 120 Hz) change frame by frame by utilizing the leader synchronize signal generator 100. FIG. 11 is a timing diagram 300 illustrating a frame rate change mechanism. In the embodiment illustrated in FIG. 11, the display line time (e.g., 3.2 microsecond) may be fixed and the vertical blanking period (VBLANK) may be a fixed time period, and a vertical active frame (VACTIVE) duration may be determined by corresponding resolution and inter-frame pauses (IFPs). A frame duration may include periods for VBLANK, VACTIVE, and vertical wait (VWAIT). The duration for VWAIT of a frame may vary based on the corresponding frame rate. Accordingly, the duration for VWAIT in a frame may be a flexible time period, which may be increased or decreased depending on frame rate change. A respective leader synchronize signal (e.g., leader synchronize signal 302, leader synchronize signal 304, leader synchronize signal 306, leader synchronize signal 308, leader synchronize signal 310) may be generated by the leader synchronize signal generator 100 and used to synchronize the TCON 102 with the processor core complex 18 based on the respective target frame duration for each frame (e.g., frame 312, frame 314, frame 316, frame 318). For instance, a leader synchronize signal may be received by the processor core complex 18 and the TCON 102 to indicate the end of a frame. For example, the leader synchronize signal 302 may indicate the end of a frame before the frame 312, the leader synchronize signal 304 may indicate the end of the frame 312, the leader synchronize signal 306 may indicate the end of the frame 314, and so on. The processor core complex 18 may send the new frame duration in a frame configuration (e.g., emission rate, frame duration, brightness, foveation information, IFP (intra frame pause) locations and length) to the TCON 102 via a corresponding SDP command at a certain time before the corresponding VACTIVE frame starts. For example, at time t1, which may be during the VBLANK of the frame 314, the processor core complex 18 may send frame configuration (e.g., a target frame duration, foveation information, IFP locations and length, brightness) of the frame 314 to the TCON 102 via a SDP command S314. Time t1 may be at a time period Dt (e.g., several lines) before time t2, when the VACTIVE frame of the frame 314 starts. Dt may be the minimum time of period for the frame configuration included in the SDP command S314 to be applied to the VACTIVE frame of the frame 314. The value of the time period Dt may be different for the frames (e.g., frame 314, 316, 318), which may be related to the corresponding frame configuration, the TCON 102, and the display panel 92. If a frame configuration associated with a frame is sent to the TCON 102 at a time period less than the corresponding minimum time period Dt before the frame begins to be displayed (e.g., due to a clock drift), the frame configuration may not be used for displaying the frame on the display panel 92 in the following vertical active frame. For example, if the SDP command S314 is sent to the TCON 102 after time t1, the frame configuration included in the SDP command S314 may not be applied to the VACTIVE frame of the frame 314. Since the leader synchronize signal generated by the leader synchronize signal generator 100 may be used to keep the processor core complex 18 and the TCON 102 synchronized for every frame, a frame configuration (e.g., a target frame duration, foveation information, IFP locations and length, brightness) associated with a frame may be sent to the TCON 102 at a time period equals to or greater than the corresponding minimum time period Dt before the frame begins to be played on the display panel 92, for every frame. In some embodiments, the TCON 102 may stay synchronized with the processor core complex 18 on a per-frame basis or on a multiple frames basis (e.g., two frame bases, three frame bases, and the like), accordingly, a frame configuration (e.g., a target frame duration, foveation information, IFP locations and length, brightness) associated with a frame may be sent to the TCON 102 via a SDP command on a per-frame basis or multiple frames basis so that the minimum time period Dt may be satisfied and the frame configuration may be used for displaying the frame on the display panel 92 in the vertical active frame following the SDP command.

A VWAIT with duration W1 may be added to the frame 314 to achieve the target frame duration. Accordingly, various VWAIT durations may be used for frames with various frame durations/rates. For example, W2 is the VWAIT duration for the frame 316 with a first frame rate (e.g., 96 Hz) and W3 is the VWAIT duration for the frame 318 with a second frame rate (e.g., 90 Hz). Since the vertical active frame (VACTIVE) duration may be determined by corresponding resolution and IFPs (inter-frame pauses), the method described above may also be used to change resolution and IFPs (e.g., IFP locations and length) as well as foveation on a per frame basis. In some embodiments, the frame configuration may be send to the TCON 102 on a multiple frames basis (e.g., two fames basis, three frames basis) or on demand (e.g., when the frame configuration is updated).

Figure 12:
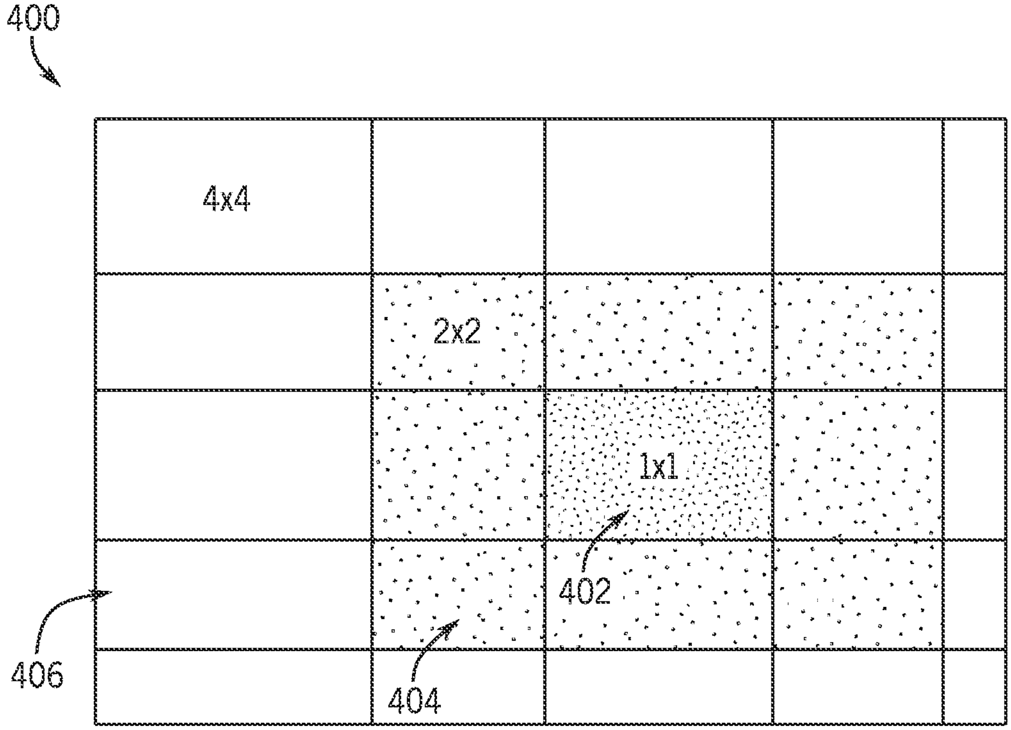
FIG. 12 is a block diagram illustrating an active frame with a dynamic foveation content, according to embodiments of the present disclosure.

As mentioned above, the processor core complex 18 may also support foveation change (e.g., fovea location or gaze point, foveation region coordinates) frame by frame by utilizing the leader synchronize signal generator 100. Foveation means that the image resolution of an image may vary across a fixation point (e.g., gaze point). Foveation may be used to reduce the number of pixels to process by grouping pixels in non-fovea regions. For dynamic foveation, the display pixel pipeline 120 may process the frame data at a fixed foveated resolution/area with coordinates depending on the dynamic changing fixation point location (e.g., based on eye tracking). FIG. 12 is a block diagram illustrating an active frame 400 with a dynamic foveation content. In FIG.

12, a region 402 corresponds to the gaze point, which contains no pixel grouping. The location of the region 402 may change from frame to frame (e.g., based on eye tracking). In region 402, the resolution is 1×1. A region 404 corresponds to a grouping of 2×2 region (2 row pixels and 2 column pixels), and a region 406 corresponds to a grouping of 4×4 region (4 row pixels and 4 column pixels). In regions with pixel grouping (e.g., region 404, region 406), the scan driver and data driver of the display panel 92 may update groups of pixels concurrently. For example, 4 pixels (2×2) in a same group in the region 404 may use the same image data and be updated concurrently. The fovea location or gaze point information may be included in the metadata sent for every frame to the processor core complex 18. The processor core complex 18 may send the foveation information (e.g., fovea location, grouping information, region coordinates) to the TCON 102 using a SDP command via the LPDP interface 106 before the VACTIVE of the corresponding frame so that the VACTIVE may display the foveation information. Accordingly, real time eye tracking may be implemented with updating foveation change (e.g., fovea location or gaze point, foveation region coordinates) on a per frame basis to improve dynamic image displaying.

The processor core complex 18 may also support ALPM (Aggressive Link Power Management) during VBLANK and IFP (inter-frame pause) to reduce power. For instance, the processor core complex 18 may send ALPM to the TCON 102 via the LPDP interface 106 during every VBLANK between frames.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An electronic device, comprising:
- an electronic display configured to display a frame of image data during an active frame duration; and
- processing circuitry configured to:
  - generate a leader synchronize signal used to synchronize a timing controller to the processing circuitry, wherein the timing controller is configured to control the electronic display; and
  - send a configuration associated with the frame to the timing controller at a certain time, during a blanking period preceding the active frame duration, before a display time when the frame begins to be displayed on the electronic display during the active frame duration, wherein the frame is configured to be displayed on the electronic display based on the configuration, wherein the configuration comprises intra frame pause information.

2. The electronic device of claim 1, wherein the intra frame pause information comprises an intra frame pause location and length, wherein the configuration comprises a duration of the frame, foveation information, brightness data, or any combination thereof.

3. The electronic device of claim 1, wherein a time period from the certain time to the display time is within a vertical blanking time of the electronic display.

4. The electronic device of claim 1, wherein the leader synchronize signal is used to indicate an end of a duration of the frame.

5. The electronic device of claim 4, wherein the duration of the frame comprises a flexible time period, wherein the flexible time period is related to a frame rate of the frame.

6. The electronic device of claim 4, wherein the duration of the frame comprises a fixed time period, wherein the fixed time period is a common value for every frame displayed on the electronic display.

7. The electronic device of claim 4, wherein a common line time is used for every frame displayed on the electronic display.

8. An electronic device, comprising:
- control circuitry configured to:
  - monitor a change of a first parameter associated with a temperature on an electronic display;
  - in response to the change of the first parameter being greater than a threshold value, calculate a coefficient indicative of a relationship between a driving voltage and a driving current of a display pixel on the electronic display based on the temperature and determine a second parameter associated with displaying a first active frame on the electronic display based on the coefficient;
  - control the electronic display to display the first active frame based on the second parameter; and
  - send out an interrupt signal; and
- processing circuitry configured to:
  - receive the interrupt signal from the control circuitry; and
  - within a threshold period after receiving the interrupt signal, read the coefficient from the control circuitry and determine a third parameter based on the coefficient, wherein the third parameter is associated with processing image data of a second active frame to be displayed on the electronic display, wherein the first active frame is displayed on the electronic display before the second active frame.

9. The electronic device of claim 8, wherein the change of the first parameter is detected by a reference array on the electronic display.

10. The electronic device of claim 8, wherein the control circuitry is synchronized to the processing circuitry for every frame displayed on the electronic display by utilizing a leader synchronize signal generated by a leader synchronize signal generator of the processing circuitry.

11. The electronic device of claim 8, wherein the second parameter comprises a gamma tap voltage (Vtap) value.

12. The electronic device of claim 11, wherein the third parameter comprises a lookup table.

13. The electronic device of claim 8, wherein the processing circuitry is configured to:
- calculate a first gamma setting based on the coefficient within the threshold period; and
- apply the first gamma setting to an active frame of the electronic display.

14. The electronic device of claim 13, wherein the control circuitry is configured to:

calculate a second gamma setting based on the coefficient after receiving a signal from the processing circuitry, wherein the signal is sent in a vertical blanking period; and apply the second gamma setting to the active frame of the electronic display.

15. The electronic device of claim 8, wherein the second parameter is different from the third parameter.

16. A method comprising:

generating, via a leader synchronize signal generator in a processing circuitry of an electronic device, a leader synchronize signal used to synchronize a timing controller to the processing circuitry, wherein the timing controller is configured to control an electronic display; and sending, via the processing circuitry through a communication interface, a configuration associated with a frame, to the timing controller at a certain time, during a blanking period preceding an active frame duration, before a display time when the frame begins to be displayed on the electronic display during the active frame duration, wherein the timing controller is configured to cause the frame to be displayed on the electronic display based on the configuration, wherein the configuration comprises intra frame pause information.

17. The method of claim 16, wherein the intra frame pause information comprises an intra frame pause location and length, wherein the configuration comprises a duration of the frame, foveation information, brightness data, or any combination thereof.

18. The method of claim 16, wherein a time period from the certain time to the display time is within a vertical blanking time of the electronic display.

19. The method of claim 16, comprising:

detecting, via the timing controller, a change of a parameter associated with a temperature on the electronic display;

in response to the change of the parameter being greater than a threshold value, calculating, via the timing controller, a coefficient indicative of a relationship between a driving voltage and a driving current of a display pixel on the electronic display based on the temperature;

sending, via the timing controller through a second communication interface, an interrupt signal to the processing circuitry; and within a threshold period after the processing circuitry receives the interrupt signal, reading, via the processing circuitry, the coefficient from the timing controller.

20. The method of claim 19, comprising:

within the threshold period after the processing circuitry receives the interrupt signal, updating a mapping relationship in the processing circuitry using the coefficient.

* * * * *